US012766060B2

(12) United States Patent
Viswanathan

(10) Patent No.: US 12,766,060 B2
(45) Date of Patent: Oct. 20, 2026

(54) SYSTEM AND METHOD FOR PROVIDING NURSING ASSISTANCE

(71) Applicant: Nidhinnath Chakkanath Viswanathan, Thrissur District (IN)

(72) Inventor: Nidhinnath Chakkanath Viswanathan, Thrissur District (IN)

(73) Assignee: Nidhinnath Viswanathan (IN)

( * ) Notice: Subject to any disclaimer, the term of this patent is extended or adjusted under 35 U.S.C. 154(b) by 108 days.

(21) Appl. No.: 18/854,061

(22) PCT Filed: Jun. 16, 2022

(86) PCT No.: PCT/IB2022/055574
§ 371 (c)(1),
(2) Date: Oct. 4, 2024

(87) PCT Pub. No.: WO2023/209429
PCT Pub. Date: Nov. 2, 2023

(65) Prior Publication Data
US 2025/0235368 A1 Jul. 24, 2025

(30) Foreign Application Priority Data
Apr. 27, 2022 (IN) ............................ 202241024834

(51) Int. Cl.
*A61G 9/02* (2006.01)

(52) U.S. Cl.
CPC ............ *A61G 9/02* (2013.01); *A61G 2203/30* (2013.01)

(58) Field of Classification Search
CPC ........ A61G 9/00; A61G 9/02; A61G 2203/30; A61G 7/0005; A61G 7/001; A61G 7/02; A61G 7/047; A47C 21/00
(Continued)

(56) References Cited

U.S. PATENT DOCUMENTS 6,594,837 B2 * 7/2003 Khait .................. A61G 7/0005 5/5
9,370,250 B2 6/2016 Ead
(Continued)

FOREIGN PATENT DOCUMENTS

CN 112022552 A 9/2024
WO 2015000069 A1 1/2015

OTHER PUBLICATIONS

Office Action for Indian Application No. 202241024834 mailed Oct. 31, 2022, 5 pages.
(Continued)

*Primary Examiner* — Tuan N Nguyen

(57) ABSTRACT

A system for providing nursing assistance is provided. The system includes a support unit. The system includes a fabric handling unit including rollers to circulate a fabric material around a predefined portion of the support unit The predefined portion of the support unit includes a support plate. The system includes a detection unit including sensors to generate sensing signals upon detecting excreta of the patient. The system includes a control unit to generate control signals upon receiving sensing signals generated by the detection unit. The system includes a cleaning unit to position a cleaning roller below the buttocks region of the patient The cleaning unit is to rotate the cleaning roller in a predefined speed to clean the buttocks region of the patient. The cleaning unit is to activate the rollers to move the fabric material contaminated by the excreta away from the patient.

10 Claims, 10 Drawing Sheets

(58) Field of Classification Search
USPC .................................... 4/480, 604, 547, 661
See application file for complete search history.

(56) References Cited

U.S. PATENT DOCUMENTS

| | | | | |
|---|---|---|---|---|
| 10,358,807 | B2 | 7/2019 | Chen et al. | |
| 2014/0259435 | A1* | 9/2014 | Ead | A61G 7/057<br>5/713 |
| 2018/0202139 | A1* | 7/2018 | Chen | E03D 11/02 |
| 2023/0301854 | A1* | 9/2023 | Carucci | A61G 7/001 |

OTHER PUBLICATIONS

International Search Report and Written Opinion mailed Sep. 15, 2022, in PCT Application No. PCT/IB2022/055574, 10 pages.

* cited by examiner

SYSTEM AND METHOD FOR PROVIDING NURSING ASSISTANCE

EARLIEST PRIORITY DATE

This application claims priority from a Complete patent application filed in India having patent application No. 202241024834, filed on Apr. 27, 2022, and titled SYSTEM AND METHOD FOR PROVIDING NURSING ASSISTANCE.

FIELD OF INVENTION

Embodiments of the present disclosure relate to the field of medical hygiene and more particularly to a system and a method for providing nursing assistance.

BACKGROUND

Patients are bedridden because of various reasons. The various reasons may include ageing, diseases, and accidents. Condition of being bedridden, demands removal of excreta by nursing caregivers. Exposure to the excreta may jeopardize health and wellness of the patients and the nursing caregivers. Also, relying on another person for removing the excreta causes mental trauma to the patients, thereby affecting mental health of the patients.

Currently existing system for providing nursing care to the patients is inefficient in identifying and disposing the excreta. Also, the system fails to sanitize private parts of the patients after excrement. Further, the system is incapable of changing the relative position of the bedridden patients with respect to a bed structure, thereby causing bed sores to the patients. The system also fails to replace contaminated fabric material in contact with the patients, which further increases risk of infection to the patients.

Hence, there is a need for an improved system and method for providing nursing assistance to address the aforementioned issue(s).

BRIEF DESCRIPTION

In accordance with an embodiment of the present disclosure, a system for providing nursing assistance is provided. The system includes a support unit adapted to provide nursing assistance to a patient. The system also includes a fabric handling unit operatively coupled to a predefined portion of the support unit. The fabric handling unit includes a plurality of rollers adapted to circulate a fabric material around the predefined portion of the support unit The predefined portion of the support unit includes a support plate. The system further includes a detection unit operatively coupled to the fabric handling unit. The detection unit includes a plurality of sensors adapted to generate one or more sensing signals upon detecting excreta of the patient in proximity of the support plate. The system also includes a control unit operatively coupled to the detection unit. The control unit is adapted to generate one or more control signals upon receiving one or more sensing signals generated by the detection unit. The system also includes a cleaning unit operatively coupled to the control unit. The cleaning unit is adapted to change position of the support plate to a predefined position to guide buttocks region of the patient into a depression formed by lowering the support plate upon receiving the one or more control signals generated by the control unit. The cleaning unit is also adapted to position a cleaning roller below the buttocks region of the patient upon changing position of the support plate. The cleaning unit further adapted to rotate the cleaning roller in a predefined speed to clean the buttocks region of the patient upon positioning the cleaning roller. The cleaning unit further also adapted to activate the plurality of rollers to move the fabric material contaminated by the excreta away from the patient upon rotating the cleaning roller, thereby providing nursing assistance to the patient.

In accordance with another embodiment of the present disclosure, a method for providing nursing assistance is provided. The method includes providing, by a support unit, nursing assistance to a patient. The method also includes circulating, by a plurality of rollers of a fabric handling unit, a fabric material around the predefined portion of the support unit. The predefined portion of the support unit includes a support plate. The method further includes generating, by a plurality of sensors of a detection unit, one or more sensing signals upon detecting excreta of the patient in proximity of the support plate. The method also includes generating, by a control unit, one or more control signals upon receiving one or more sensing signals generated by the detection unit. The method also includes changing, by a cleaning unit, position of the support plate to a predefined position to guide buttocks region of the patient into a depression formed by lowering the support plate upon receiving the one or more control signals generated by the control unit. The method also includes positioning, by the cleaning unit, a cleaning roller below the buttocks region of the patient upon changing position of the support plate. The method also includes rotating, by the cleaning unit, the cleaning roller in a predefined speed to clean the buttocks region of the patient upon positioning the cleaning roller. The method further includes activating, by the cleaning unit, the plurality of rollers to move the fabric material contaminated by the excreta away from the patient upon rotating the cleaning roller, thereby providing nursing assistance to the patient.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which.

Figure 1:
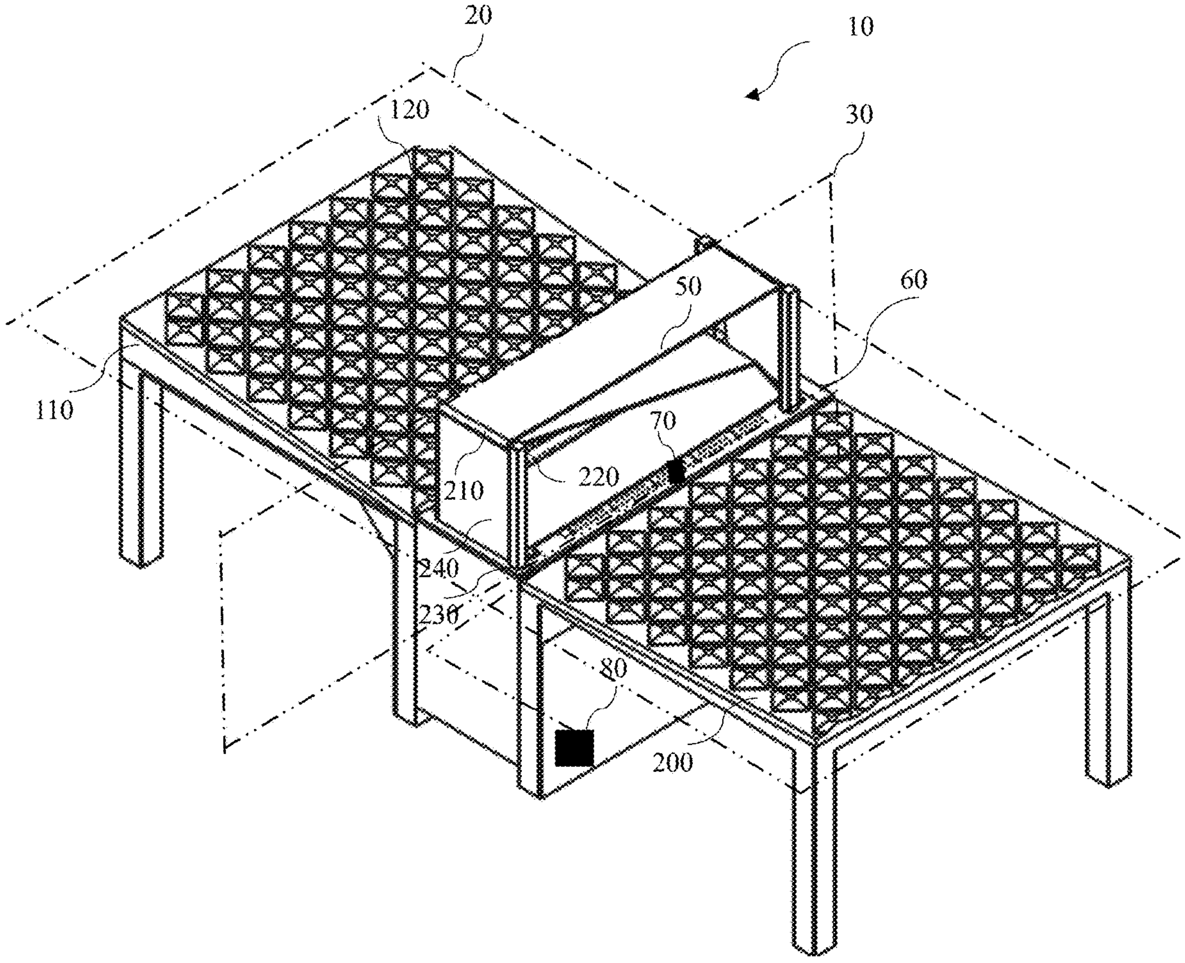
FIG. 1 is a schematic representation of a support unit in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises . . . a" does not, without more constraints, preclude the existence of other devices, sub-systems, elements, structures, components, additional devices, additional sub-systems, additional elements, additional structures, or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of the present disclosure relate to a system and a method for providing nursing assistance. In accordance with an embodiment of the present disclosure, a system and method for nursing assistance is provided. Nursing assistance is about aiding the patients, families, and communities to attain, maintain, or recover optimal health and quality of life. Nursing assistance also demands assessing situations and providing assistance accordingly. Aiding bedridden patients is far more demanding than aiding the patients who are mobile. Skin of the bedridden patients may develop bed sores due to lack of mobility of the bedridden patients. Also, excreta handling of the bedridden patients requires manual intervention by the nursing care giver which may create mental trauma to the bedridden patients. Providing clean outfits to the bedridden patients in a timely manner may not be possible when the outfits are contaminated by the excreta which further increases chances of infection. Hence the system and method described hereafter in FIG. 1 is the system and the method for providing nursing assistance.

FIG. 1 is a schematic representation of a support unit (20) in accordance with an embodiment of the present disclosure. The system (10) includes a support unit (20) adapted to provide nursing assistance to a patient. In a specific embodiment, the patient may include, a person suffering from mobility issues, a bedridden individual, an old age person and the like. In one embodiment, the support unit (20) may include a first support structure (110) including a cushioning layer (120) fabricated by sandwiching a first layer between a second layer and a third layer. In such an embodiment, the first layer may include water. In one embodiment, the second layer, and the third layer may be composed of a vinyl material.

Further, in some embodiments, the cushioning layer (120) may include an inlet port and an outlet port to supply and drain water from the first layer respectively. In one embodiment, a water pump may provide water to the first layer via the inlet port. In one embodiment, the second layer may include one or more protrusions adapted to reduce surface area of the second layer to prevent bed sores being developed on the patient resting on the support unit (20). In such an embodiment, the one or more protrusions may be filled with poly-urethane gel. In a specific embodiment, the support unit (20) may include a second support structure (200) including a gel bed. In one embodiment, the support unit (20) may include a plurality of pneumatic actuators adapted to change relative position of the patient with respect to the support unit (20).

Furthermore, in another embodiment, the support unit (20) may include a plurality of hydraulic actuators adapted to change relative position of the patient with respect to the support unit (20). In one embodiment, the first support structure (110) and the second support structure (200) may include inclinations of 5° and 3° respectively with respect to a predefined portion of the support unit (20). In such an embodiment, the inclinations may prevent moisture accumulation in the first support structure (110) and the second support (200) structure by guiding water molecules towards the predefined portion of the support unit (20). The predefined portion of the support unit (20) includes a support plate (60). In one embodiment, the support plate (60) may be adapted to support buttocks region of the patient resting on the support unit (20).

Also, in one embodiment, the support plate (60) may include a plurality of perforations adapted to pass excreta of the patient in liquid form to a collection tray (FIG. 2, 130) mounted underneath the support plate (60). The system (10) also includes a fabric handling unit (30) operatively coupled to the predefined portion of the support unit (20). The fabric handling unit (30) includes a plurality of rollers (FIG. 2, 40) adapted to circulate a fabric material (50) around the predefined portion of the support unit (20). In one embodiment, the fabric material (50) may be composed of poly urethane. In one embodiment, the fabric material (50) may be fabricated by heat blending of cotton or a poly blended material on the poly urethane.

Additionally, in one embodiment, the fabric material (50) may be circulated around the predefined portion of the support unit (20) via one or more guide rollers (210). In such an embodiment, the one or more guide rollers (210) may be adapted to move between a first position (220) and a second position (230) on the fabric handling unit (30) to raise or lower the fabric material (50) with respect to the support plate (60). In one embodiment, the fabric material (50) may be enclosing the buttocks region of the patient resting on the support plate (60). In such an embodiment, the fabric material (50) may be moving between the buttocks region of the patient and the support plate (60). In a specific embodiment, one or more shields (240) are mounted on lateral sides of the fabric handling unit (30) to keep private parts of the patient being visible from an external environment when the one or more guide rollers (210) are positioned at the first point.

Besides, in one embodiment, the system (10) may include a cleansing unit (FIG. 2, 170) located underneath the support unit (20). In a specific embodiment, the cleansing unit (FIG. 2, 170) may include one or more nozzles (FIG. 2, 180) adapted to direct water or disinfectants on the fabric material (50) to wash or disinfect the fabric material (50). In some embodiments, the cleansing unit (FIG. 2, 170) may also include one or more blowers (FIG. 2, 190) adapted to dry or disinfect the fabric material (50). In one embodiment, a storage bin (FIG. 2, 250) may store additional fabric material (50) required either during movement of the one or more guide rollers (210) or during change in position of the support plate (60). The system (10) further includes a detection unit (70) operatively coupled to the fabric handling unit (30).

Further, the detection unit (70) includes a plurality of sensors adapted to generate one or more sensing signals upon detecting excreta of the patient in proximity of the support plate (60). In one embodiment, the detection unit (70) may slide along the lateral edges of the support plate (60) with respect to position of the patient on the support plate (60). In such an embodiment, the detection unit (70) may slide along the lateral edges of the support plate by an electric actuator. Movement of the detection unit may along the lateral edges. In one embodiment, the plurality of sensors may include, but not limited to, at least one of a stool detection sensor, one or more urine detection sensors (400), a proximity sensor and an image sensor. In a specific embodiment, the image sensor may include a camera capable of detecting color, shape and nature of the excreta, position of the patient above the support plate (60), one or more health conditions of the patient by analyzing the excreta. Movement of the detection unit (70) along the lateral edges of the support plate (60) may provide a way for the image sensor to establish a line of sight towards the buttocks region of the patient. In one embodiment, the one or more urine detection sensors (400) may be distributed on the support plate (60).

Figure 2:
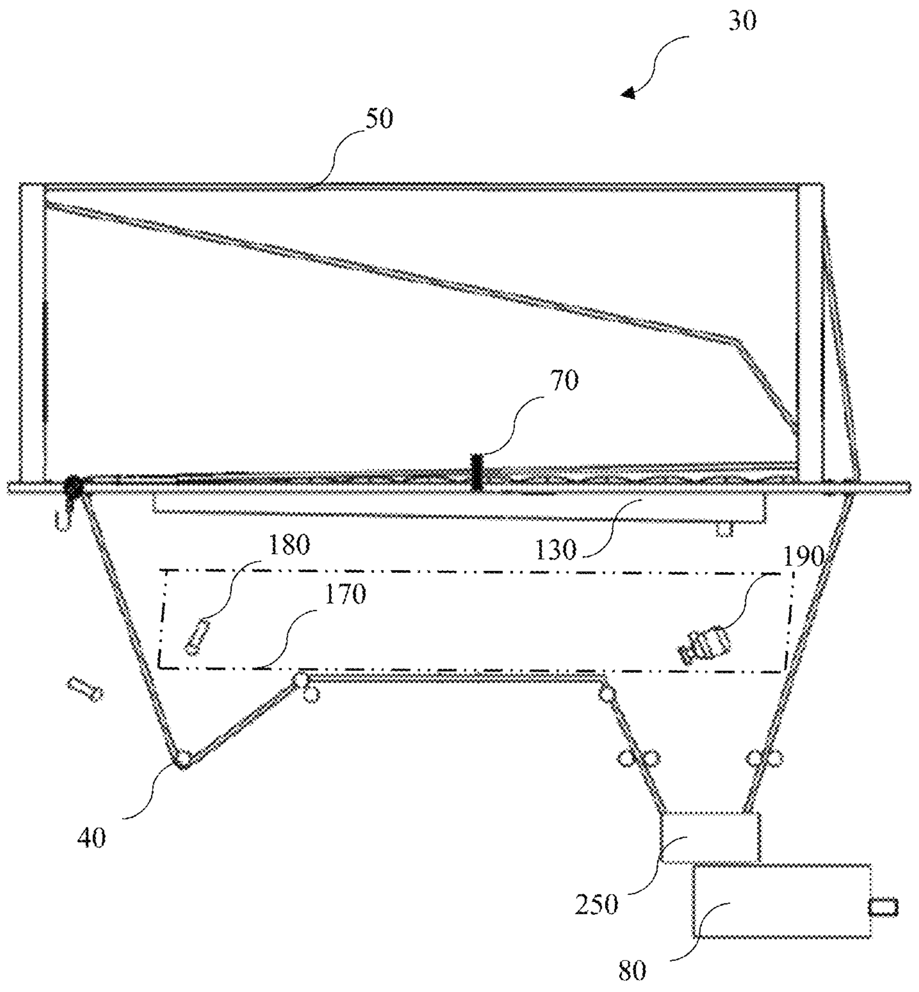
FIG. 2 is a schematic representation depicting operational arrangement of a fabric handling unit, a detection unit, and a control unit support unit in accordance with an embodiment of the present disclosure.
Figure 3:
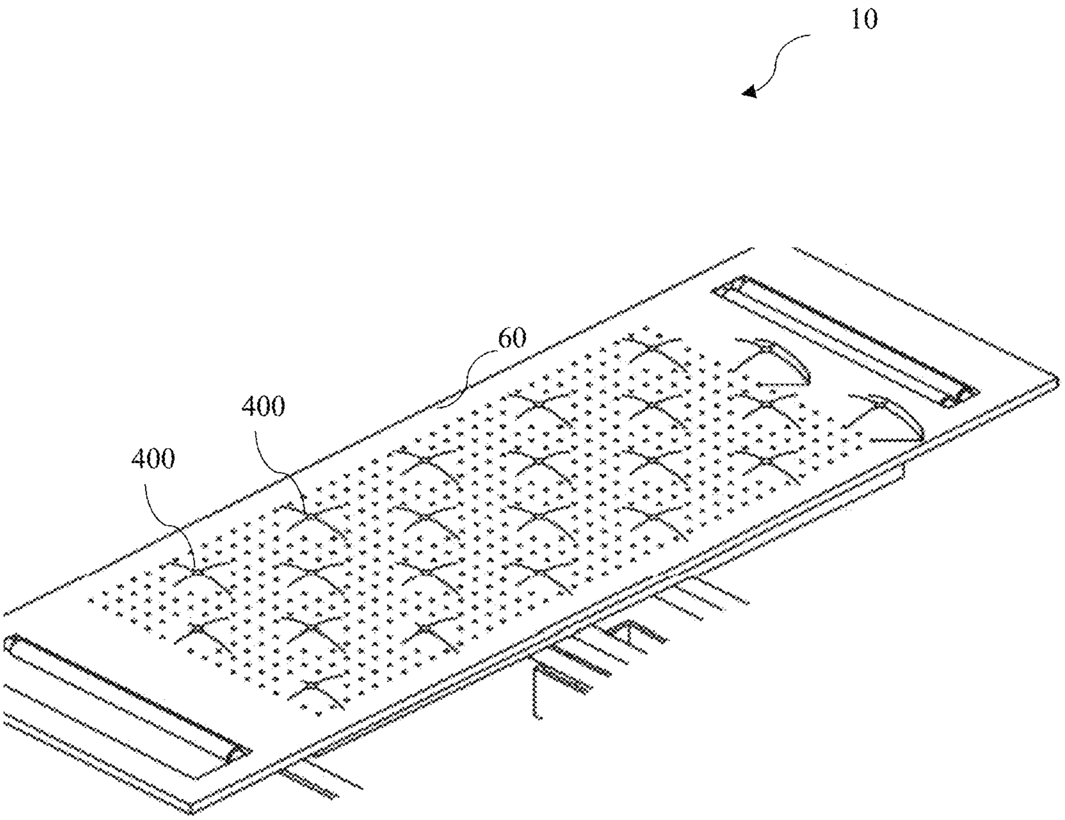
FIG. 3 is a schematic representation depicting detailed view of a support plate in accordance with an embodiment of the present disclosure.

Furthermore, the system (10) also includes a control unit (80) operatively coupled to the detection unit (70). The control unit (80) is adapted to generate one or more control signals upon receiving one or more sensing signals generated by the detection unit (70). Operational arrangement of the fabric handling unit (30), the detection unit (70), and the control unit (80) support unit (20) is shown in FIG. 2. Detailed view of the support plate (60) is shown in FIG. 3. Operation of a cleaning unit (90) is associated with the control unit (80) is described in detail in FIG. 4.

Figure 4:
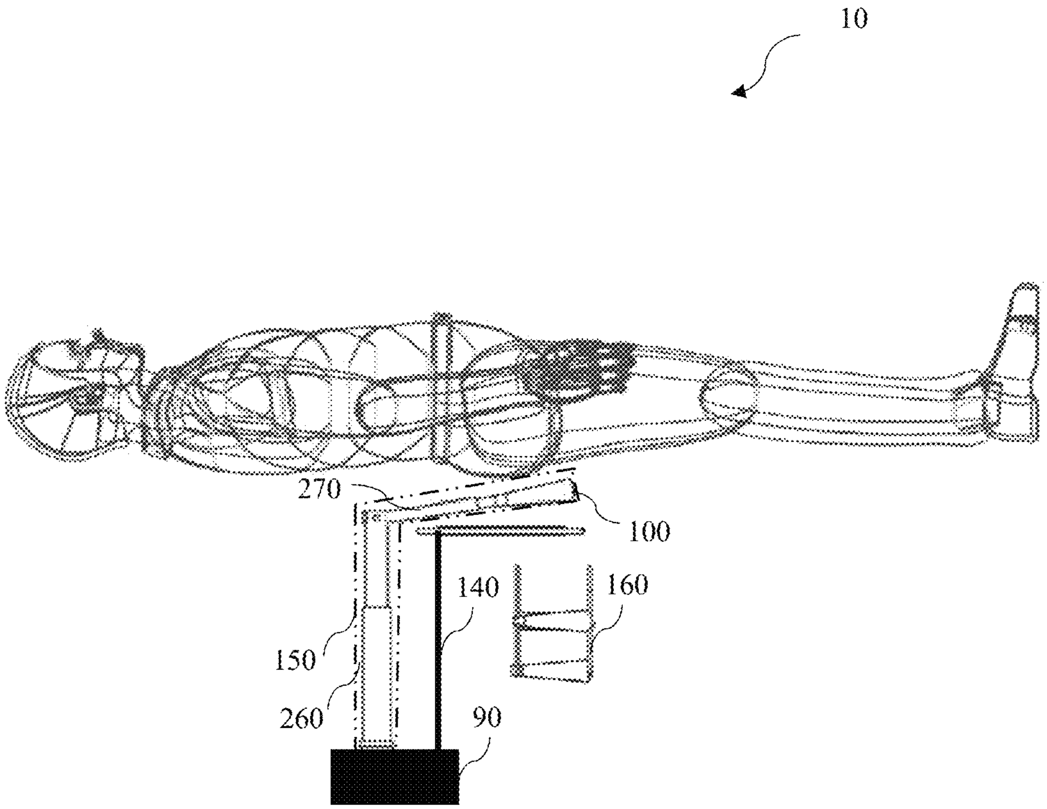
FIG. 4 is a schematic representation of a cleaning unit in accordance with an embodiment of the present disclosure.

FIG. 4 is a schematic representation of a cleaning unit (90) in accordance with an embodiment of the present disclosure. The system (10) also includes a cleaning unit (90) operatively coupled to the control unit (80). The cleaning unit (90) is adapted to change position of the support plate (60) to a predefined position to guide buttocks region of the patient into a depression formed by lowering the support plate (60) upon receiving the one or more control signals generated by the control unit (80). In one embodiment, the cleaning unit (90) may include an actuator (140) adapted to change position of the support plate (60) to the predefined position upon receiving the one or more control signals generated by the control unit (80). In some embodiments, the actuator (140) may include a linear actuator including a pneumatic actuator. In a specific embodiment, the actuator (140) may include a hydraulic actuator. In one embodiment, the actuator (140) may include an electric actuator.

Also, the cleaning unit (90) is also adapted to position a cleaning roller (100) below the buttocks region of the patient upon changing position of the support plate (60). In one embodiment, the cleaning unit (90) may include a moving arm (150) adapted to position the cleaning roller (100) below the buttocks region of the patient. In such an embodiment, the moving arm (150) may include a proximity sensor adapted to provide a predefined clearance to the moving arm (150) from the buttocks region of the patient. In one embodiment, the moving arm (150) may include a stem (260) and a roller handle (270). In one embodiment, the stem (260) may be capable of rotating, extending, and retracting with respect to longitudinal axis of the stem (260). In such an embodiment, multidimensional movement of the stem (260) enables the roller handle (270) to lift the cleaning roller (100) from a roller treating unit (160).

Additionally, the stem (260) may also position the roller handle (270) below the buttocks region of the patient. In one embodiment, the roller handle (270) may include a locking mechanism to secure the cleaning roller (100) to the roller handle (270). In one embodiment, the roller handle (270) may be capable of rotating about a longitudinal axis of the roller handle (270) while extending or retracting about the longitudinal axis of the roller handle (270). In some embodiments, rotational speed of the cleaning roller (100) may be less than 10 RPM. In one embodiment, the moving arm (150) may be adapted to place the cleaning roller (100) in the roller treating unit (160) upon cleaning the buttocks region of the patient.

Figure 5:
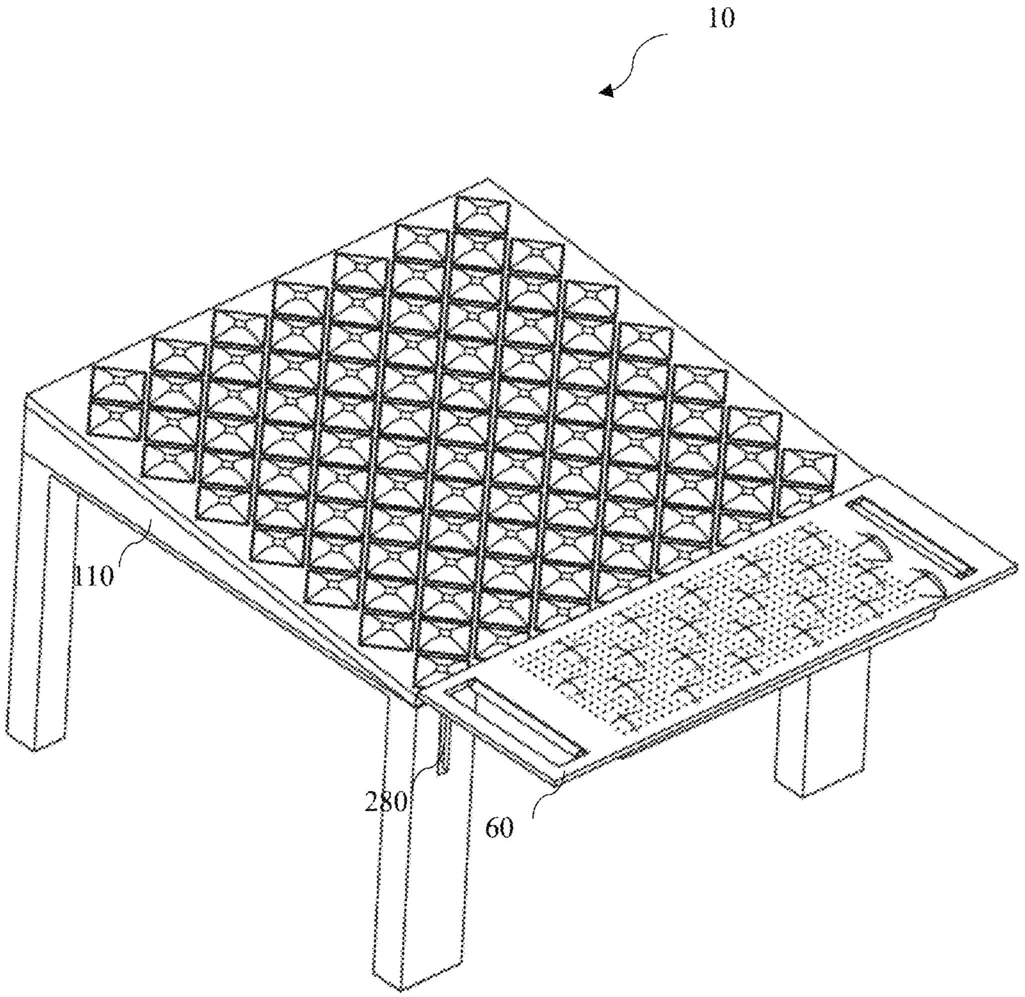
FIG. 5 is a schematic representation depicting one or more grooves in accordance with an embodiment of the present disclosure.

Also, in such an embodiment, the roller treating unit (160) may be adapted to clean the cleaning roller (100) by at least one of a process comprising washing, disinfecting, and drying. In one embodiment, movement of the support plate (60) may be guided by one or more grooves associated with the support unit (20). The one or more grooves (FIG. 5, 280) are shown in FIG. 5. Operation of the moving arm (150) and the roller treating unit (160) is described in detail in FIG. 6.

Figure 6:
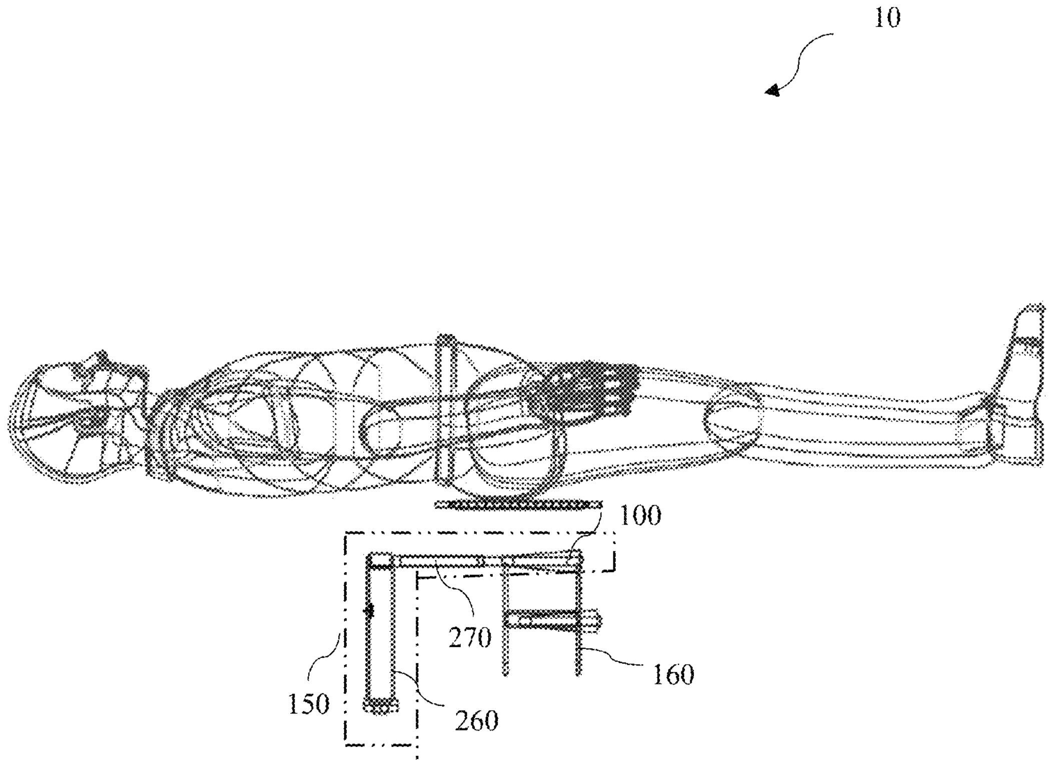
FIG. 6 is a schematic representation depicting operational arrangement of the moving arm and the roller treating unit in accordance with an embodiment of the present disclosure.

FIG. 6 is a schematic representation depicting operational arrangement of the moving arm (150) and the roller treating unit (160) in accordance with an embodiment of the present disclosure. In one embodiment, the cleaning roller (100) may be located on the roller treating unit (160). In such an embodiment, the roller handle (270) may pick up the cleaning roller (100) from the roller treating unit (160). In an exemplary embodiment, the stem (150) may rotate 110° with respect to the longitudinal axis of the stem (150). In such an embodiment, the stem (150) may position the roller handle (100) below the buttocks region of the person when the support plate (60) moves to the predefined position. Upon cleaning the buttocks region of the patient, the moving arm (150) may place the cleaning roller (100) in the roller treating unit (160). Operation of the roller treating unit (160) is described in detail in FIG. 7.

Figure 7:
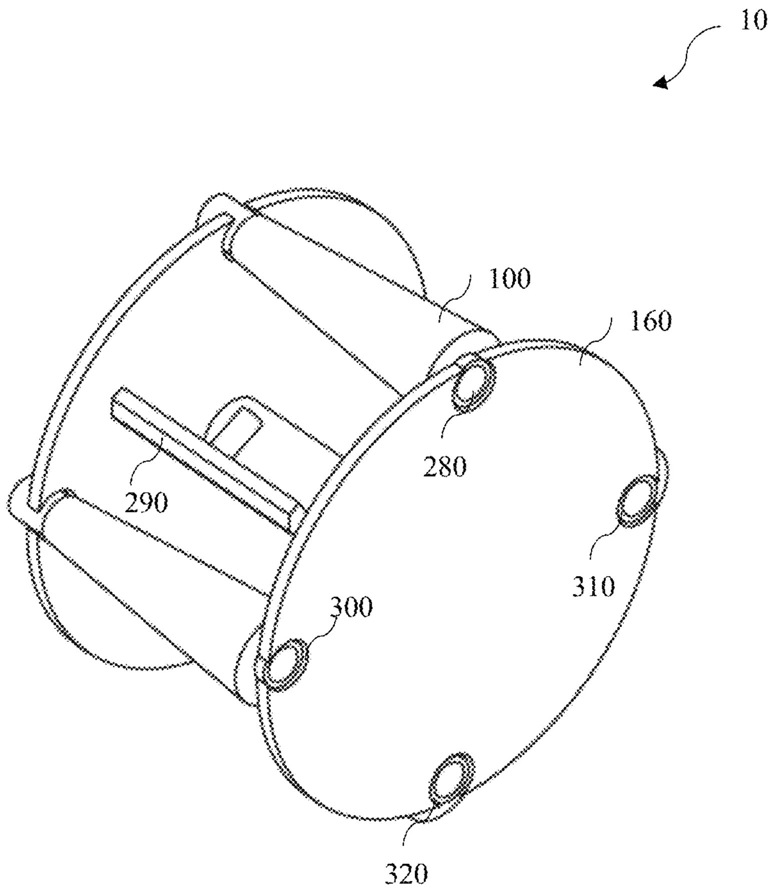
FIG. 7 is a schematic representation depicting detailed view of the roller treating unit in accordance with an embodiment of the present disclosure.

FIG. 7 is a schematic representation depicting detailed view of the roller treating unit (160) in accordance with an embodiment of the present disclosure. In one embodiment, the roller treating unit (160) may include a lock adapted to secure the cleaning roller (100) to the roller treating unit (160). In such an embodiment, the lock may get released to receive the cleaning roller (100) when the roller handle (270) comes in proximity of the roller treating unit (160). In one embodiment, the lock may get closed when the roller handle (270) moves away from the roller treating unit (160). In one embodiment, the moving arm (150) may pick up or place the cleaning roller (100) at a first point (280) of the roller treating unit (160).

Further, in some embodiments, a washing nozzle (290) may direct water towards the cleaning roller (100) to wash the cleaning roller (100) when the cleaning roller (100) reaches a second point (300). In one embodiment, a drying nozzle may dry the cleaning roller (100) when the cleaning roller (100) reaches a third point (320). In one embodiment, a drying nozzle may disinfect the cleaning roller (100) when the cleaning roller (100) reaches a fourth point (310). In one embodiment, the drying nozzle may be positioned diametrically opposite to the washing nozzle (290). In an exemplary embodiment, the roller treating unit (160) may house upto four cleaning roller (100) at a time. In one embodiment, the roller treating unit (160) may rotate about a fixed axis due to force exerted by the washing nozzle (290) and the drying nozzle on the cleaning roller (100) placed on the roller treating unit (160). In one embodiment, the roller treating unit (160) may be rotated about the fixed axis by a gear arrangement. In some embodiments, movement of the roller treating unit (160) may be controlled by a servomotor. Working of the system (10) is explained in detail in FIG. 8.

Figure 8:
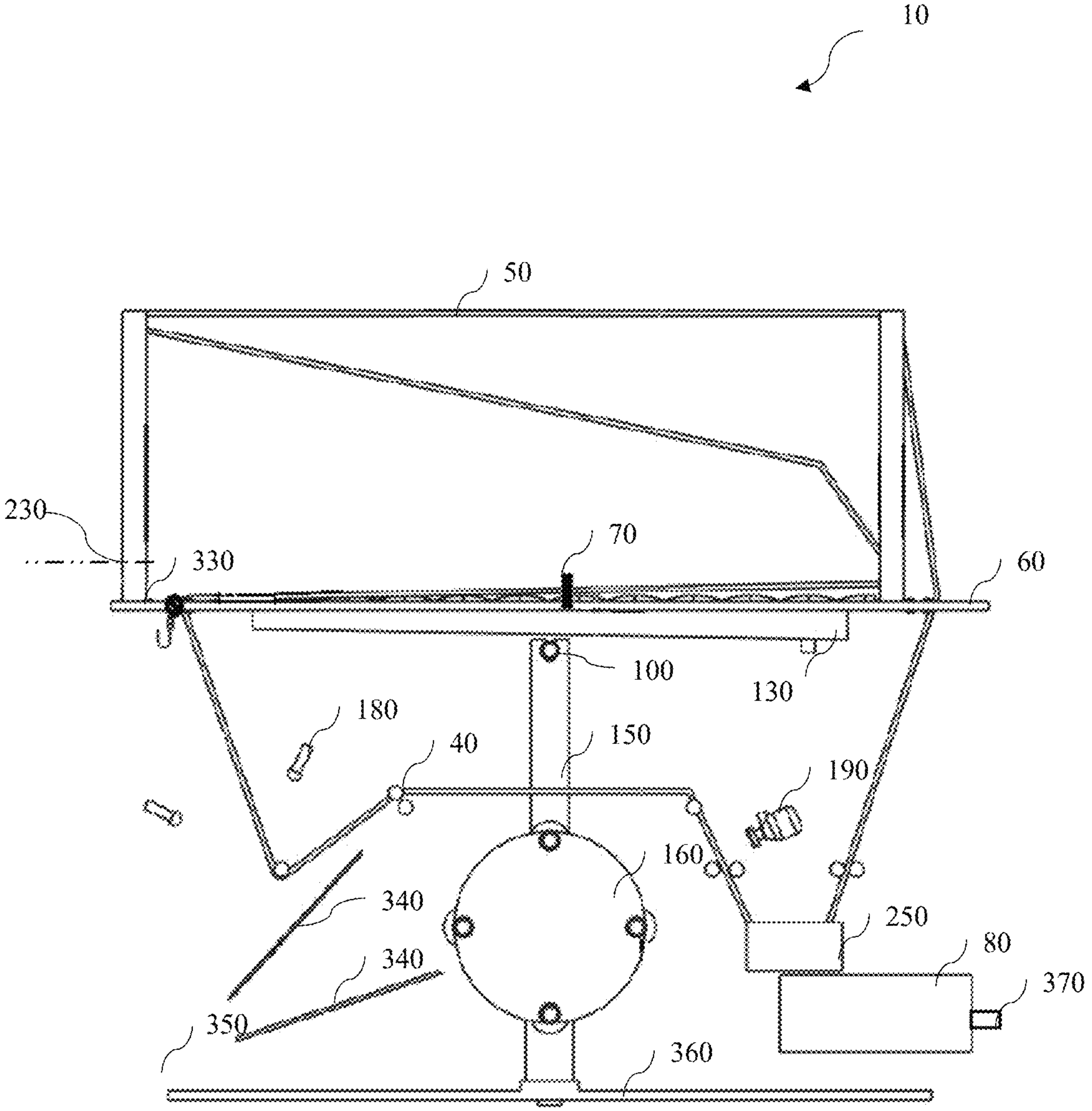
FIG. 8 is a schematic representation of a system for providing nursing assistance in accordance with an embodiment of the present disclosure.

FIG. 8 is a schematic representation of a system (10) for providing nursing assistance in accordance with an embodiment of the present disclosure. Initially, the fabric material (50) may be removed from the one or more guide rollers (210) associated with the fabric handling unit (30). The one or more guide rollers (210) may be kept at the second position (230). The patient may be resting on the support unit (20) with buttocks region of the patient supported by the support plate (60). The fabric material (50) may be attached to the one or more guide rollers (210) covering the buttocks region of the patient. The plurality of sensors associated with the detection unit (70) may generate one or more sensing signals upon detecting excreta of the patient in proximity of the support plate (60).

Moreover, the control unit (80) may generate one or more control signals upon receiving one or more sensing signals generated by the sensing unit. Consider a scenario in which the excreta contains only urine. The urine may pass over the fabric material (50) and reach the support plate (60). The one or more perforations in the support plate (60) may guide the urine to the collection tray (130) mounted below the support plate (60). In such a scenario, the cleaning unit (90) may change position of the support plate (60) to the predefined position after a predefined time. Changing the position of the support plate (60) to the predefined position may guide the buttocks region of the patient into the depression formed by lowering the support plate (60).

Also, the cleaning unit (90) may activate the plurality of rollers (40) to move the fabric material (50) contaminated by the urine away from the patient. The support plate (60) may get cleaned by the movement of the fabric material (50) above the support plate (60). A suction unit associated with the collection tray (130) may remove the urine accumulated in the collection tray (130). The cleaning unit (90) may change position of the support plate (60) back to original position thereafter.

Additionally, consider another scenario in which the excreta detected by the one or more sensors is stool passed by the patient. The cleaning unit (90) may change position of the support plate (60) to the predefined position to guide buttocks region of the patient into the depression formed by lowering the support plate (60) upon receiving the one or more control signals. The cleaning unit (90) may also activate the plurality of rollers (40) to move the fabric material (50) contaminated by the stool away from the patient and deposit the fabric material (50) in the bin (250). After a predefined time, the cleaning unit (90) may position the cleaning roller (100) below the buttocks region of the patient by the moving arm (150).

Further, the cleaning unit (90) may rotate the cleaning roller (100) to clean the buttocks region of the patient. Upon cleaning the buttocks region of the patient, the cleaning roller (100) may be placed in the roller treating unit (160) by the moving arm (150). The moving arm (150) may again pick up another cleaning roller (100) present in the roller treating unit (160) for cleaning the buttocks region of the patient. The control unit (80) may provide positional information of the patient to the cleaning unit (90) to enable the cleaning unit (90) to guide the moving arm (150) below the buttocks region of the patient. Upon cleaning the buttocks region of the patient, the cleaning unit (90) may again activate the plurality of rollers (40) to move the fabric material (50) contaminated by the stool away from the patient along with changing position of the support plate (60) to the original position. The one or more nozzles (180) may direct water on the fabric material (50) to wash the fabric material (50).

Furthermore, in one embodiment, the control unit (80) may be providing, one or more control signals to the one or more blowers (190), suction units and the like. In some embodiments, the system (10) may include an inlet gate (330) adapted to provide access to space located underneath the support plate (60). In one embodiment, the system (10) may include one or more partition plates (340) adapted to guide wastewater from the fabric material (50), and the cleaning roller (100) towards an outlet (350). In such an embodiment, a drain pump may be connected to the outlet to drain the wastewater from the outlet (350). In one embodiment, the system (10) may include a base plate (360) adapted to guide the wastewater or waste materials towards the outlet (350).

Figure 9:
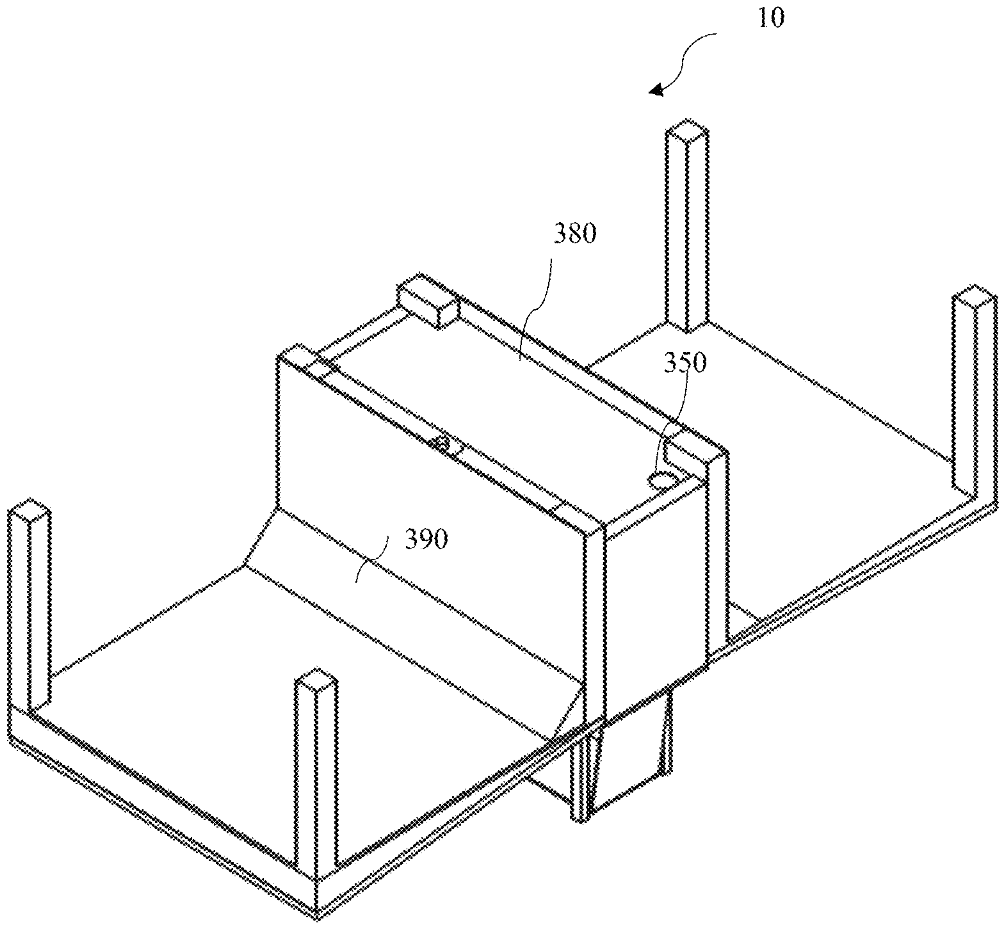
FIG. 9 is a schematic representation depicting a bin cover, a rubber mounting, and an outlet in accordance with an embodiment of the present disclosure.

Moreover, in such an embodiment, the base plate (360) may be sloped towards the outlet (350). In one embodiment, electrical connections and the water inlet to the system (10) may be provide via an inlet port (370). In some embodiments, enclosure of the predefined portion of the support unit may be having bin cover (FIG. 9, 380) adapted to prevent flow of the wastewater to an external environment. In such an embodiment, the bin cover (FIG. 9, 380) may be secured to the first support structure (110) and the second support structure via a rubber mounting (FIG. 9, 390) to prevent transmission of vibrations to the first support structure (110) and the second support unit (20). In one embodiment, the first support structure (110) and the second support structure may be overlayed on the predefined portion of the support unit (20) to prevent skin trapping of the patient. The bin cover (FIG. 9, 380), the rubber mounting (FIG. 9, 390), and the outlet (350) is shown in FIG. 9.

Figure 10:
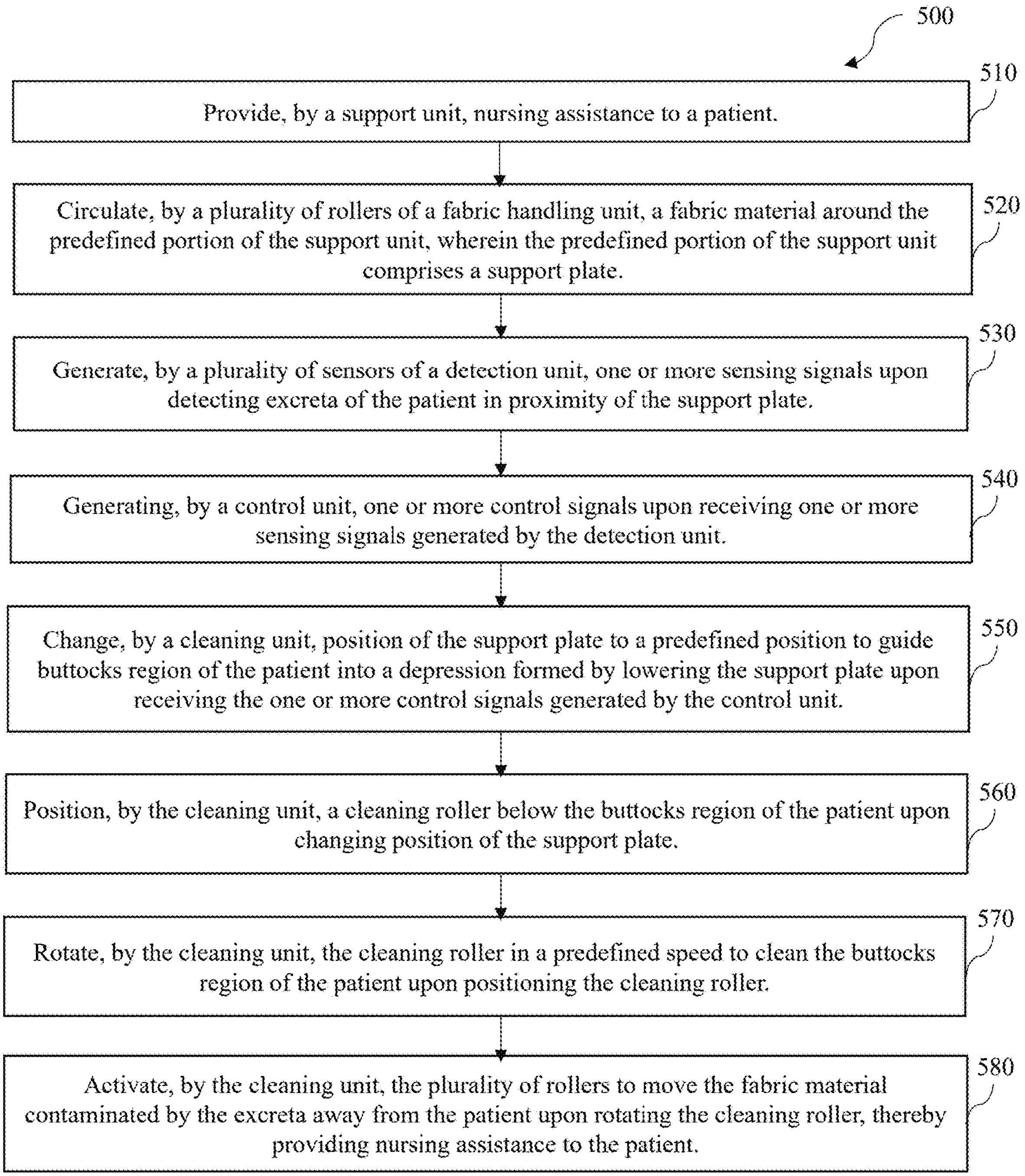
FIG. 10 is a flow chart representing the steps involved in a method for providing nursing assistance in accordance with an embodiment of the present disclosure.

FIG. 10 is a flow chart representing the steps involved in a method (500) for providing nursing assistance in accordance with an embodiment of the present disclosure. The method (500) includes providing nursing assistance to a patient. In one embodiment, providing nursing assistance to a patient includes providing nursing assistance to a patient by a support unit in step 510. In one embodiment, the support unit may include a first support structure including a cushioned layer fabricated by sandwiching a first layer between a second layer and a third layer. In such an embodiment, the first layer may include water. In one embodiment, the second layer, and the third layer may be composed of a vinyl material.

Further, in some embodiments, the cushioned layer may include an inlet port and an outlet port to supply and drain water from the first layer respectively. In one embodiment, a water pump may provide water to the first layer via the inlet port. In one embodiment, the second layer may include one or more protrusions adapted to reduce surface area of the second layer to prevent bed sores being developed on the patient. In such an embodiment, the one or more protrusions may be filled with poly-urethane gel. In a specific embodiment, the support unit may include a second support structure including a gel bed. In one embodiment, the support unit may include a plurality of pneumatic actuators adapted to change relative position of the patient with respect to the support unit.

Additionally, in another embodiment, the support unit may include a plurality of hydraulic actuators adapted to change relative position of the patient with respect to the support unit. In one embodiment, the first support structure and the second support structure may include inclinations of 5° and 3° respectively with respect to a predefined portion of the support unit. In such an embodiment, the inclinations may prevent moisture accumulation in the first support structure and the second support structure by guiding water molecules towards the predefined portion of the support unit.

The method (500) also includes circulating a fabric material around the predefined portion of the support unit in step 520. In one embodiment, circulating a fabric material around the predefined portion of the support unit includes circulating a fabric material around the predefined portion of the support unit by a plurality of rollers of a fabric handling unit. The predefined portion of the support unit includes a support plate. In one embodiment, the support plate may include a plurality of perforations adapted to pass excreta of the patient in liquid form to a collection tray mounted underneath the support plate. In one embodiment, the fabric material may be fabricated by heat blending of cotton or a poly blended material on the poly urethane.

Further, in one embodiment, the fabric material may be circulated around the predefined portion of the support unit via one or more guide rollers. In such an embodiment, the one or more guide rollers may be adapted to move between a first position and a second position on the fabric handling unit to raise or lower the fabric material with respect to the support plate. In one embodiment, the fabric material may be enclosing the buttocks region of the patient resting on the support plate. In such an embodiment, the fabric material may be moving between the buttocks region of the patient and the support plate. In a specific embodiment, one or more shields are mounted on lateral sides of the fabric handling unit to keep private parts of the patient being visible from an external environment when the one or more guide rollers are positioned at the first point.

Moreover, in one embodiment, the system may include a cleansing unit located underneath the support unit. In a specific embodiment, the cleansing unit may include one or more nozzles adapted to direct water or disinfectants on the fabric material to wash or disinfect the fabric material. In some embodiments, the cleansing unit may also include one or more blowers adapted to dry or disinfect the fabric material. In one embodiment, a storage bin may store additional fabric material required either during movement of the one or more guide rollers or during change in position of the support plate.

The method (500) further includes generating one or more sensing signals upon detecting excreta of the patient in proximity of the support plate in step 530. In one embodiment, generating one or more sensing signals upon detecting excreta of the patient in proximity of the support plate includes generating one or more sensing signals upon detecting excreta of the patient in proximity of the support plate by a plurality of sensors of a detection unit. In one embodiment, the detection unit may slide along the lateral edges of the support plate with respect to position of the patient on the support plate. In such an embodiment, the detection unit may slide along the lateral edges of the support plate by an electric actuator. In one embodiment, the plurality of sensors may include, but not limited to, at least one of a stool detection sensor, one or more urine detection sensors, a proximity sensor and an image sensor. Movement of the detection unit (70) along the lateral edges of the support plate (60) may provide a way for the image sensor to establish a line of sight towards the buttocks region of the patient. In a specific embodiment, the image sensor may include a camera capable of detecting color, shape and nature of the excreta, position of the patient above the support plate, one or more health conditions of the patient by analyzing the excreta. In one embodiment, the one or more urine detection sensors may be distributed on the support plate.

The method (500) also includes generating one or more control signals upon receiving one or more sensing signals generated by the detection unit in step 540. In one embodiment, generating one or more control signals upon receiving one or more sensing signals generated by the detection unit includes generating one or more control signals upon receiving one or more sensing signals generated by the detection unit by a control unit.

The method (500) also includes changing position of the support plate to a predefined position to guide buttocks region of the patient into a depression formed by lowering the support plate upon receiving the one or more control signals generated by the control unit in step 550. In one embodiment, changing position of the support plate to a predefined position to guide buttocks region of the patient into a depression formed by lowering the support plate upon receiving the one or more control signals generated by the control unit includes changing position of the support plate to a predefined position to guide buttocks region of the patient into a depression formed by lowering the support plate upon receiving the one or more control signals generated by the control unit by a cleaning unit.

Also, in one embodiment, the cleaning unit may include an actuator adapted to change position of the support plate to the predefined position upon receiving the one or more control signals generated by the control unit. In some embodiments, the actuator may include a linear actuator including a pneumatic actuator. In a specific embodiment, the actuator may include a hydraulic actuator. In one embodiment, the cleaning unit may activate the plurality of rollers to move the fabric material to move the excreta away from the patient upon receiving the one or more control signals from the control unit.

The method (500) also includes positioning a cleaning roller below the buttocks region of the patient upon changing position of the support plate in step 560. In one embodiment, positioning a cleaning roller below the buttocks region of the patient upon changing position of the support plate includes positioning a cleaning roller below the buttocks region of the patient upon changing position of the support plate by the cleaning unit. In one embodiment, the cleaning unit may include a moving arm adapted to position the cleaning roller below the buttocks region of the patient. In such an embodiment, the moving arm may include a proximity sensor adapted to provide a predefined clearance to the moving arm from the buttocks region of the patient.

Also, in one embodiment, the moving arm may include a stem and a roller handle. In one embodiment, the stem may be capable of rotating, extending, and retracting with respect to longitudinal axis of the stem. In such an embodiment, multidimensional movement of the stem enables the roller handle to lift the cleaning roller from the predefined position. In one embodiment, the roller handle may be capable of rotating about a longitudinal axis of the roller handle while extending or retracting about the longitudinal axis of the roller handle. In some embodiments, rotational speed of the cleaning roller may be less than 10 RPM. In one embodiment, the moving arm may be adapted to place the cleaning roller in a roller treating unit upon cleaning the buttocks region of the patient.

Besides, in such an embodiment, the roller treating unit may be adapted to clean the cleaning roller by at least one of a process comprising washing, disinfecting, and drying. In one embodiment, movement of the support plate may be guided by one or more grooves associated with the support unit. In one embodiment, the cleaning roller may be located on the roller treating unit. In such an embodiment, the roller handle may pick up the cleaning roller from the roller treating unit. In an exemplary embodiment, the stem may rotate 110° with respect to the longitudinal axis of the stem. In such an embodiment, the stem may position the roller handle below the buttocks region of the person when the support plate moves to the predefined position.

Additionally, upon cleaning the buttocks region of the patient, the moving arm may place the cleaning roller in the roller treating unit. In one embodiment, the roller treating unit may include a lock adapted to secure the cleaning roller to the roller treating unit. In such an embodiment, the lock may get released to receive the cleaning roller when the roller handle comes in proximity of the roller treating unit. In one embodiment, the lock may get closed when the roller handle moves away from the roller treating unit. In one embodiment, the moving arm may pick up or place the cleaning roller at a first point of the roller treating unit. In some embodiments, a washing nozzle may direct water towards the cleaning roller to wash the cleaning roller when the cleaning roller reaches a second point.

Also, in one embodiment, a drying nozzle may dry the cleaning roller when the cleaning roller reaches a third point. In one embodiment, a drying nozzle may disinfect the cleaning roller when the cleaning roller reaches a fourth point. In one embodiment, the drying nozzle may be positioned diametrically opposite to the washing nozzle. In an exemplary embodiment, the roller treating unit may house upto four cleaning rollers at a time. In one embodiment, the roller treating unit may rotate about a fixed axis due to force exerted by the washing nozzle and the drying nozzle on the cleaning roller placed on the roller treating unit.

The method (500) includes rotating the cleaning roller in a predefined speed to clean the buttocks region of the patient upon positioning the cleaning roller in step 570. In one embodiment, rotating the cleaning roller in a predefined speed to clean the buttocks region of the patient upon positioning the cleaning roller includes rotating the cleaning roller in a predefined speed to clean the buttocks region of the patient upon positioning the cleaning roller by the cleaning unit.

The method (500) further includes activating the plurality of rollers to move the fabric material contaminated by the excreta away from the patient upon rotating the cleaning roller, thereby providing nursing assistance to the patient in step 580. In one embodiment, activating the plurality of rollers to move the fabric material contaminated by the excreta away from the patient upon rotating the cleaning roller, thereby providing nursing assistance to the patient includes activating the plurality of rollers to move the fabric material contaminated by the excreta away from the patient upon rotating the cleaning roller, thereby providing nursing assistance to the patient by the cleaning unit.

Various embodiments of the system and method for providing nursing assistance described above enable various advantages. Provision of the detection unit, the control unit and the cleaning unit enables detection and cleaning of the excreta in a timely manner, thereby reducing occurrence of infections. Provision of the cushioning layer prevents formation of bed sores by preventing formation of pressure points on the skin of the patient. Provision of the plurality of linear actuators provides a way to change position of the patient which further prevents occurrence of the bed sores. Provision of the cleaning unit ensures cleaning of the buttocks region of the patient, thereby ensures hygiene of the patient. Provision of the fabric handling unit provides disinfected fabric material to the patient. Provision of the cleansing unit cleans or disinfects the fabric material. Also, provision of the roller treating unit cleans the cleaning roller thereby ensuring multiple uses of the cleaning roller. The predefined portion of the support unit may be fabricated based on individual preferences. Provision of the moving arm enables accurate cleaning of the buttocks region of the patient. Also, the system is simple, portable and easy to install. Provision of the polyurethane fabric material may not become wet or absorb water, thereby providing a dry support to the patient.

It will be understood by those skilled in the art that the foregoing general description and the following detailed description are exemplary and explanatory of the disclosure and are not intended to be restrictive thereof. While specific language has been used to describe the disclosure, any limitations arising on account of the same are not intended.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, the order of processes described herein may be changed and are not limited to the manner described herein. Moreover, the actions of any flow diagram need not be implemented in the order shown; nor do all the acts need to be necessarily performed. Also, those acts that are not dependent on other acts may be performed in parallel with the other acts. The scope of embodiments is by no means limited by these specific examples.

I claim:

1. A system for providing nursing assistance comprising:

a support unit adapted to provide nursing assistance to a patient;

a fabric handling unit operatively coupled to a predefined portion of the support unit, wherein the fabric handling unit comprises a plurality of rollers adapted to circulate a fabric material around the predefined portion of the support unit, wherein the predefined portion of the support unit comprises a support plate;

a detection unit operatively coupled to the fabric handling unit, wherein the detection unit comprises a plurality of sensors adapted to generate one or more sensing signals upon detecting excreta of the patient in proximity of the support plate;

a control unit operatively coupled to the detection unit, wherein the control unit is adapted to generate one or more control signals upon receiving one or more sensing signals generated by the detection unit;

a cleaning unit operatively coupled to the control unit, wherein the cleaning unit is adapted to:

change position of the support plate to a predefined position to guide buttocks region of the patient into a depression formed by lowering the support plate upon receiving the one or more control signals generated by the control unit;

position a cleaning roller below the buttocks region of the patient upon changing position of the support plate;

rotate the cleaning roller in a predefined speed to clean the buttocks region of the patient upon positioning the cleaning roller; and activate the plurality of rollers to move the fabric material contaminated by the excreta away from the patient upon rotating the cleaning roller, thereby providing nursing assistance to the patient.

2. The system as claimed in claim 1, wherein the support unit comprises a first support structure comprising a cushioning layer fabricated by sandwiching a first layer between a second layer and a third layer, wherein the first layer comprises water and the second layer and the third layer are composed of a vinyl material.

3. The system as claimed in claim 1, wherein the support unit comprises a plurality of pneumatic actuators adapted to change relative position of the patient with respect to the support unit.

4. The system as claimed in claim 1, wherein the support plate comprises a plurality of perforations adapted to pass the excreta in liquid form to a collection tray mounted underneath the support plate.

5. The system as claimed in claim 1, wherein the plurality of sensors comprises at least one of a stool detection sensor, a urine detection sensor, a proximity sensor and an image sensor.

6. The system as claimed in claim 1, wherein the cleaning unit comprises an actuator adapted to change position of the support plate to the predefined position upon receiving the one or more control signals generated by the control unit.

7. The system as claimed in claim 1, wherein the cleaning unit comprises a moving arm adapted to position the cleaning roller below the buttocks region of the patient, wherein the moving arm comprises a proximity sensor adapted to provide a predefined clearance to the moving arm from the buttocks region of the patient.

8. The system as claimed in claim 7, wherein the moving arm is adapted to place the cleaning roller in a roller treating unit upon cleaning the buttocks region of the patient, wherein the roller treating unit is adapted to clean the cleaning roller by at least one of a process comprising washing, disinfecting, and drying.

9. The system as claimed in claim 1, comprising a cleansing unit located underneath the support unit, wherein the cleansing unit comprises:

one or more nozzles adapted to provide a pressurized water flow on the fabric material being circulated to wash the fabric material; and one or more blowers adapted to dry or disinfect the fabric material being circulated.

10. A method comprising:

providing, by a support unit, nursing assistance to a patient;

circulating, by a plurality of rollers of a fabric handling unit, a fabric material around the predefined portion of the support unit, wherein the predefined portion of the support unit comprises a support plate;

generating, by a plurality of sensors of a detection unit, one or more sensing signals upon detecting excreta of the patient in proximity of the support plate;

generating, by a control unit, one or more control signals upon receiving one or more sensing signals generated by the detection unit;

changing, by a cleaning unit, position of the support plate to a predefined position to guide buttocks region of the patient into a depression formed by lowering the support plate upon receiving the one or more control signals generated by the control unit;

positioning, by the cleaning unit, a cleaning roller below the buttocks region of the patient upon changing position of the support plate;

rotating, by the cleaning unit, the cleaning roller in a predefined speed to clean the buttocks region of the patient upon positioning the cleaning roller; and activating, by the cleaning unit, the plurality of rollers to move the fabric material contaminated by the excreta away from the patient upon rotating the cleaning roller, thereby providing nursing assistance to the patient.

* * * * *